(12) United States Patent
Yoshikawa

(10) Patent No.: US 8,135,074 B2
(45) Date of Patent: Mar. 13, 2012

(54) STORAGE AND READ OF MEMORY AREAS AND INFORMATION FOR DECODING

(75) Inventor: Hiroshi Yoshikawa, Kanagawa (JP)

(73) Assignee: Sony Corporation (JP)

( * ) Notice: Subject to any disclaimer, the term of this patent is extended or adjusted under 35 U.S.C. 154(b) by 388 days.

(21) Appl. No.: 12/381,859

(22) Filed: Mar. 17, 2009

(65) Prior Publication Data

US 2009/0238265 A1    Sep. 24, 2009

(30) Foreign Application Priority Data

Mar. 19, 2008    (JP) ................ P2008-071692

(51) Int. Cl.
*H04N 7/12*    (2006.01)

(52) U.S. Cl. .................................. 375/240.25

(58) Field of Classification Search ............. 375/240.03, 375/240.23, 240.25
See application file for complete search history.

*Primary Examiner* — Jay Patel
*Assistant Examiner* — Richard Torrente
(74) *Attorney, Agent, or Firm* — Lerner, David, Littenberg, Krumholz & Mentlik, LLP

(57) ABSTRACT

Provided herein is a decoding apparatus including: a pixel group information storage section configured to include memory areas each of which stores, as pixel group information, information concerning a corresponding pixel group and is referred to with a horizontal address of the pixel group, and an additional memory area that is located at a left end and stores a value indicating invalid pixel group information; a decoding information generation section configured to acquire the pixel group information identified by an address of a pixel group to be decoded and an address to the left thereof, and generating decoding information; a decoding section configured to perform a decoding process based on the decoding information; and a pixel group information update section configured to generate pixel group information and allowing it to be stored in the memory area identified by the address of the pixel group.

8 Claims, 16 Drawing Sheets

FIG. 7

| SE (SYNTAX ELEMENT) | CondTerm(SE) | |
| :---: | :---: | :---: |
| | WHEN DECODED | WHEN NOT DECODED |
| mb_skip_flag | ! bin0 | 1 |
| mb_field_decoding_flag | bin0 | 0 |
| mb_type | bin0 | 0 |
| transform_size_8x8_flag | bin0 | 0 |
| intra_chroma_pred_mode | bin0 | 0 |
| coded_block_pattern | bin0 | 0 |
| mb_qp_delta | mb_qp_delta != 0 | 0 | bin0: TOP OF DECODED BIT SEQUENCE

STORAGE AND READ OF MEMORY AREAS AND INFORMATION FOR DECODING

CROSS REFERENCES TO RELATED APPLICATIONS

The present invention application claims priority from Japanese Patent Application No. JP 2008-071692, filed in the Japanese Patent Office on Mar. 19, 2008, the entire content of which is incorporated herein by reference.

BACKGROUND OF THE INVENTION

1. Field of the Invention

The present invention relates to a decoding apparatus. In particular, the present invention relates to a decoding apparatus that decodes data encoded in accordance with context-adaptive coding, a method of the decoding, and a program for causing a computer to execute the method.

2. Description of the Related Art

In H.264, which has been standardized by ITU-T (International Telecommunication Union-Telecommunication standardization sector), context-adaptive binary arithmetic coding (CABAC) and context-adaptive variable length coding (CAVLC) are defined as high-efficiency coding systems (see ITU-T H.264, for example). In the above coding systems, an efficient algorithm is adaptively selected in accordance with a context of a coding coefficient.

In the CABAC coding system, an encoding/decoding method is defined for each parameter forming a macroblock. This parameter is called a syntax element (SE). When the decoding is started, it is necessary to first calculate a context index (ctxIdx) corresponding to the syntax element. This context index is given by the sum of a context index offset (ctxIdxOffset), which is a value uniquely defined for each type of the syntax element, and a context index increment (ctxIdxInc), which is derived from information about adjacent macroblocks which have already been decoded.

$$ctxIdx = ctxIdxOffset + ctxIdxInc$$

Here, referring to FIG. 13A, a context index increment (ctxIdxInc) for position C is given by the following equation, based on syntax elements SE_A and SE_B for a left macroblock (position A) and an upper macroblock (position B) already decoded, respectively, and a conditional flag generation function CondTerm(SE), which is defined for each type of the syntax element:

$$ctxIdxInc = CondTerm(SE\_A) + CondTerm(SE\_B)$$

Note that the following equation, where a weight for the upper macroblock is doubled, is applied in some cases:

$$ctxIdxInc = CondTerm(SE\_A) + 2 \times CondTerm(SE\_B)$$

However, a description of such cases will be omitted below, because application of the above equation does not make an essential difference.

Depending on where a macroblock in question is located within a frame, one or more of the adjacent macroblocks may be absent (NA: Not Available). In such cases, a value unique to each syntax element, CondTerm_NA, is used (FIGS. 13B, 13C, and 13D).

$$ctxIdxInc = CondTerm(SE\_A) + CondTerm\_NA$$

$$ctxIdxInc = CondTerm\_NA + CondTerm(SE\_B)$$

$$ctxIdxInc = CondTerm\_NA + CondTerm\_NA$$

Similarly, in the case of the CAVLC coding system, when a quantized DCT (Discrete Cosine Transform) coefficient is decoded, an average of the number of DCT coefficients quantized for the left macroblock (position A) and the number of DCT coefficients quantized for the upper macroblock (position B) is used when selecting a variable length coding (VLC) table that is used for the decoding of position C. In other words, in the case of the CAVLC coding system, as well as in the case of the CABAC coding system, reference to the information about the left macroblock and the upper macroblock occur frequently.

SUMMARY OF THE INVENTION

In the case where a method of processing varies depending on whether the adjacent macroblocks are present or not, it is necessary to determine whether or not each of all macroblocks is an uppermost or leftmost macroblock, and determine a proper method of processing for each macroblock. FIG. 14 illustrates an exemplary known procedure in the case of the CABAC coding system.

In this procedure, first, address A, which is an address of a left neighbor, is calculated (step S981), and if the address A is valid (step S982), a conditional flag for the address A is generated (step S983), whereas if the address A is not valid, a value indicating invalidity is generated (step S984). Then, address B, which is an address of an upper neighbor, is calculated (step S985), and if the address B is valid (step S986), a conditional flag for the address B is generated (step S987), whereas if the address B is not valid, a value indicating invalidity is generated (step S988). The values generated in the above-described manner are added together to generate the context index increment (step S991), and the context index increment is added to the context index offset to generate the context index (step S992). Based on this context index, CABAC decoding is performed (step S993).

In addition, information about macroblocks in another slice should be regarded as invalid (NA), even in the case of positions that have an adjacent macroblock. Therefore, in the case where each frame is composed of a plurality of slices, a more complicated determination process is required.

Now, focus is placed on the conditional flag generation function CondTerm(SE). An algorithm for generating the conditional flag based on the value of the SE includes complicated determination processes. An example of such complicated determination processes is a process for CondTerm (SE) for a macroblock type (mb_type). FIG. 15 illustrates a procedure for this process.

When a conditional flag (condTermFlagN) for the macroblock type is generated, if an address mbAddrN is not available for use (step S971), the conditional flag is set to "0" (step S977). In the case where the address mbAddrN is available for use, the conditional flag is set to "0" (step S977) if the context index offset is "0" and the macroblock type of the address mbAddrN is "SI" (step S973). Meanwhile, if the context index offset is "3" and the macroblock type of the address mbAddrN is "I_N×N" (step S974), the conditional flag is set to "0" (step S977). Meanwhile, if the context index offset is "27" and the macroblock type of the address mbAddrN is "skipped" (step S975), the conditional flag is set to "0" (step S977). Meanwhile, if the context index offset is "27" and the macroblock type of the address mbAddrN is "B_Direct_16×16" (step S976), the conditional flag is set to "0" (step S977). If none of the above conditions is satisfied, the conditional flag is set to "1" (step S978).

Moreover, most of the decoded macroblocks are referred to twice, once as a left macroblock and once as an upper macroblock, and the function is accordingly executed twice. For example, referring to FIG. 16, position A is first referred to as a left neighbor of position C and thereafter referred to as an upper neighbor of position E. Because the above-described procedure for generating the conditional flag is performed each time such reference occurs, an entire process takes a long time.

While the processing in the case of the CABAC coding system has been described above by way of example, the same is true with the case of the CAVLC coding system.

The present invention addresses the above-identified, and other problems associated with existing methods and apparatuses, and aims to simplify a process that is performed based on information concerning adjacent macroblocks, when data encoded in accordance with the context-adaptive coding is decoded.

According to one embodiment of the present invention, there is provided a decoding apparatus including: pixel group information storage means including a plurality of memory areas each of which stores, as pixel group information, information concerning a corresponding pixel group and is referred to with a horizontal address of the pixel group in a frame, and an additional memory area that is located at a left end of the plurality of memory areas and stores a value that indicates invalid pixel group information; decoding information generation means for acquiring the pixel group information stored in memory areas identified by an address of a pixel group that is to be decoded and an address to an immediate left of that address, and generating, as decoding information, information that is necessary for decoding of the pixel group that is to be decoded; decoding means for performing a decoding process based on the decoding information; and pixel group information update means for generating pixel group information concerning the pixel group that is to be decoded based on a value based on the decoding information, and allowing the generated pixel group information to be stored in the memory area in the pixel group information storage means that is identified by the address of the pixel group that is to be decoded to update the pixel group information. This makes it possible to generate information that is necessary for the decoding of the pixel group with a simple process, by acquiring the pixel group information concerning the pixel group from the pixel group information storage means.

According to another embodiment of the present invention, there is provided a decoding apparatus including: macroblock information storage means including a plurality of memory areas each of which stores, as macroblock information, a conditional flag used for generating a context index increment for a corresponding macroblock and is referred to with a horizontal address of the macroblock in a frame, and an additional memory area that is located at a left end of the plurality of memory areas and stores a value that indicates invalid macroblock information; context index increment generation means for generating the context index increment based on the conditional flags stored in memory areas identified by an address of a macroblock that is to be decoded and an address to an immediate left of that address; decoding means for performing a CABAC decoding process based on a context index calculated based on the context index increment; and macroblock information update means for generating the conditional flag concerning the macroblock that is to be decoded based on a value obtained as a result of the decoding process, and allowing the generated conditional flag to be stored in the memory area in the macroblock information storage means that is identified by the address of the macroblock that is to be decoded to update the conditional flag. This makes it possible to generate information that is necessary for the decoding of the macroblock with a simple process, by acquiring the macroblock information concerning the macroblock from the macroblock information storage means.

According to yet another embodiment of the present invention, there is provided a decoding apparatus including: block information storage means including a plurality of memory areas each of which stores, as block information, the number of DCT coefficients quantized for a corresponding block and is referred to with a horizontal address of the block in a frame, and an additional memory area that is located at a left end of the plurality of memory areas and stores a value that indicates invalid block information; variable-length coding table determination means for determining a variable-length coding table based on the numbers of quantized DCT coefficients stored in memory areas identified by an address of a block that is to be decoded and an address to an immediate left of that address; decoding means for performing a CAVLC decoding process based on the determined variable-length coding table; and block information update means for generating the number of DCT coefficients quantized for the block that is to be decoded based on a value obtained as a result of the decoding process, and allowing the generated number of DCT coefficients quantized to be stored in the memory area in the block information storage means that is identified by the address of the block that is to be decoded to update the number of DCT coefficients quantized. This makes it possible to generate information that is necessary for the decoding of the block with a simple process, by acquiring the block information concerning the block from the block information storage means.

According to yet another embodiment of the present invention, there is provided a decoding method employed in a decoding apparatus that has pixel group information storage means including a plurality of memory areas each of which stores, as pixel group information, information concerning a corresponding pixel group and is referred to with a horizontal address of the pixel group in a frame, and an additional memory area that is located at a left end of the plurality of memory areas and stores a value that indicates invalid pixel group information. The decoding method includes the steps of: a) acquiring the pixel group information stored in memory areas identified by an address of a pixel group that is to be decoded and an address to an immediate left of that address, and generating, as decoding information, information that is necessary for decoding of the pixel group that is to be decoded; b) performing a decoding process based on the decoding information; and c) generating pixel group information concerning the pixel group that is to be decoded based on a value based on the decoding information, and allowing the generated pixel group information to be stored in the memory area in the pixel group information storage means that is identified by the address of the pixel group that is to be decoded to update the pixel group information.

According to yet another embodiment of the present invention, there is provided a program for causing a computer to execute the following steps, in a decoding apparatus that has pixel group information storage means including a plurality of memory areas each of which stores, as pixel group information, information concerning a corresponding pixel group and is referred to with a horizontal address of the pixel group in a frame, and an additional memory area that is located at a left end of the plurality of memory areas and stores a value that indicates invalid pixel group information: a) acquiring the pixel group information stored in memory areas identified by an address of a pixel group that is to be decoded and an address to an immediate left of that address, and generating, as decoding information, information that is necessary for decoding of the pixel group that is to be decoded; b) performing a decoding process based on the decoding information; and c) generating pixel group information concerning the pixel group that is to be decoded based on a value based on the decoding information, and allowing the generated pixel group information to be stored in the memory area in the pixel group information storage means that is identified by the address of the pixel group that is to be decoded to update the pixel group information.

According to embodiments of the present invention, it is possible to simplify a process that is performed based on information concerning adjacent macroblocks, when data encoded in accordance with the context-adaptive coding is decoded.

BRIEF DESCRIPTION OF THE DRAWINGS

FIG. 7 illustrates values of a conditional flag generation function CondTerm(SE) according to an embodiment of the present invention;

DETAILED DESCRIPTION OF THE PREFERRED EMBODIMENTS

Next, preferred embodiments of the present invention will be described in detail below with reference to the accompanying drawings.

Figure 1:
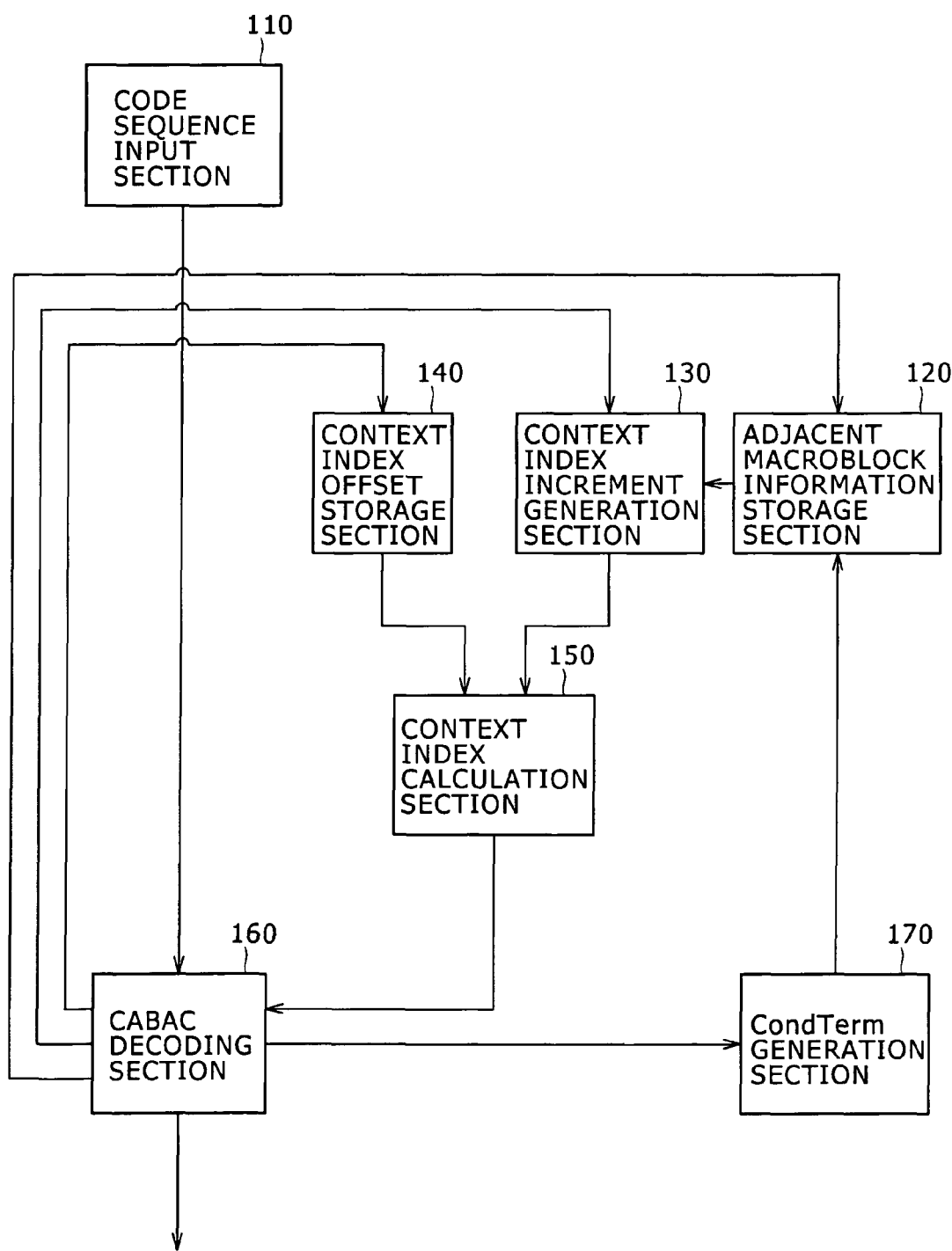
FIG. 1 illustrates an exemplary functional structure of a decoding apparatus according to a first embodiment of the present invention.

FIG. 1 illustrates an exemplary functional structure of a decoding apparatus according to a first embodiment of the present invention. This decoding apparatus includes a code sequence input section 110, an adjacent macroblock information storage section 120, a context index increment generation section 130, a context index offset storage section 140, a context index calculation section 150, a CABAC decoding section 160, and a CondTerm generation section 170.

The code sequence input section 110 inputs, as input data, a code sequence encoded in accordance with the CABAC coding system. The input data as inputted via the code sequence input section 110 is supplied to the CABAC decoding section 160.

The adjacent macroblock information storage section 120 stores, as macroblock information, information concerning adjacent macroblocks of a target macroblock. As will be described later, in H.264, each frame is divided into macroblocks. Each macroblock represents a block of 16 (lines) by 16 pixels. In the CABAC coding system, generation of a context index increment (ctxIdxInc) requires values of a conditional flag generation function CondTerm(SE) based on syntax elements for a left macroblock and an upper macroblock. The adjacent macroblock information storage section 120 stores, as the macroblock information, the values of the conditional flag generation function CondTerm(SE).

The context index increment generation section 130 reads the values of the conditional flag generation function from the adjacent macroblock information storage section 120, and generates the context index increment (ctxIdxInc) based on these values. Specifically, regarding the syntax elements for the left macroblock (position A) and the upper macroblock (position B) relative to the target macroblock as SE_A and SE_B, respectively, the context index increment generation section 130 reads conditional flag generation functions CondTerm(SE_A) and CondTerm(SE_B) from the adjacent macroblock information storage section 120, and adds them together to calculate the context index increment. The value of the conditional flag generation function CondTerm(SE) is either "0" or "1," and therefore, the value of the context index increment is "0," "1," or "2." The context index increment generation section 130 supplies the context index increment generated in the above-described manner to the context index calculation section 150.

The context index offset storage section 140 stores a value of a context index offset (ctxIdxOffset) for each type of the syntax elements. The type of the syntax element is indicated by the CABAC decoding section 160. The context index offset storage section 140 supplies the context index offset to the context index calculation section 150 in accordance with the type of the syntax element.

The context index calculation section 150 adds the context index offset, which is supplied from the context index offset storage section 140, and the context index increment, which is supplied from the context index increment generation section 130, together to calculate a context index (ctxIdx). The context index calculated by the context index calculation section 150 is supplied to the CABAC decoding section 160.

The CABAC decoding section 160 decodes the input data supplied from the code sequence input section 110, based on the context index supplied from the context index calculation section 150. The CABAC decoding section 160 decodes the input data, and outputs a syntax element.

The CondTerm generation section 170 generates a value of the conditional flag generation function CondTerm(SE) based on a result of the decoding performed by the CABAC decoding section 160. The value of the conditional flag generated by the CondTerm generation section 170 is stored in the adjacent macroblock information storage section 120. Specific values generated by the CondTerm generation section 170 and a method of the generation of such values will be described later (see FIG. 7).

Figure 2:
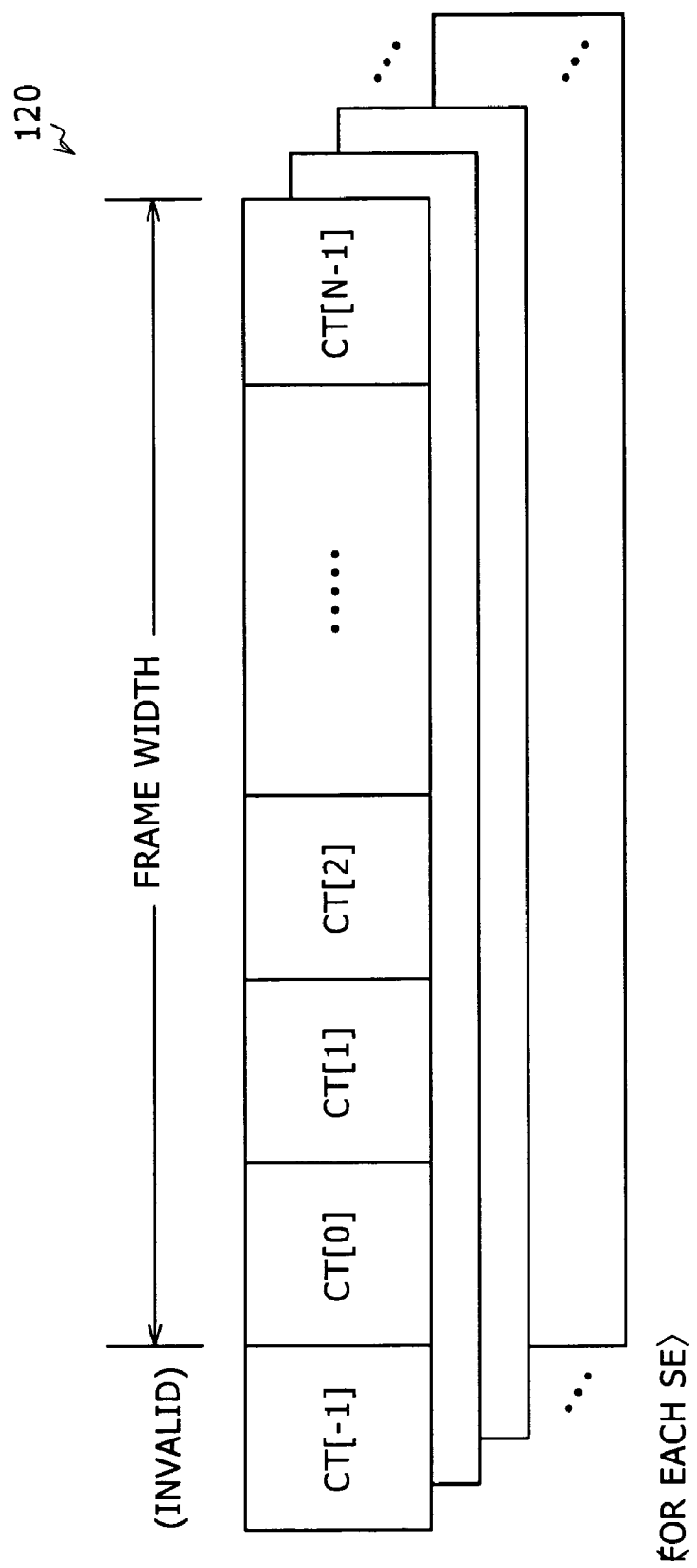
FIG. 2 illustrates an exemplary structure of an adjacent macroblock information storage section according to an embodiment of the present invention.

FIG. 2 illustrates an exemplary structure of the adjacent macroblock information storage section 120 according to this embodiment of the present invention. For each type of the syntax element, the adjacent macroblock information storage section 120 has N+1 memory areas, where N is the number of macroblocks along a frame width. Each memory area is assigned an index number, which ranges from "−1" to "N−1," and the memory area is accessed via a horizontal macroblock address. These memory areas are represented as CT[−1] to CT[N−1].

The index number of a leftmost macroblock in the frame is "0," whereas the index number of a rightmost macroblock in the frame is "N−1." The memory area CT[−1], which is assigned the index number "−1," is used to store macroblock information about a hypothetical macroblock to the left of the leftmost macroblock, and stores a value indicating invalidity of the macroblock information.

In the adjacent macroblock information storage section 120, memory areas CT[−1] to CT[N−1] corresponding to one line are used in accordance with the type of the syntax element indicated by the CABAC decoding section 160.

When a decoding process for a new frame is started, and when a decoding process for a new slice is started, the values in the adjacent macroblock information storage section 120 are initialized to the value that indicates invalid macroblock information. This eliminates the need for a process of determining the position of the target macroblock, i.e., a macroblock that is to be decoded, and the need for a process of determining whether or not a macroblock that is to be referred to is included in the same slice as the target macroblock.

Figure 3:
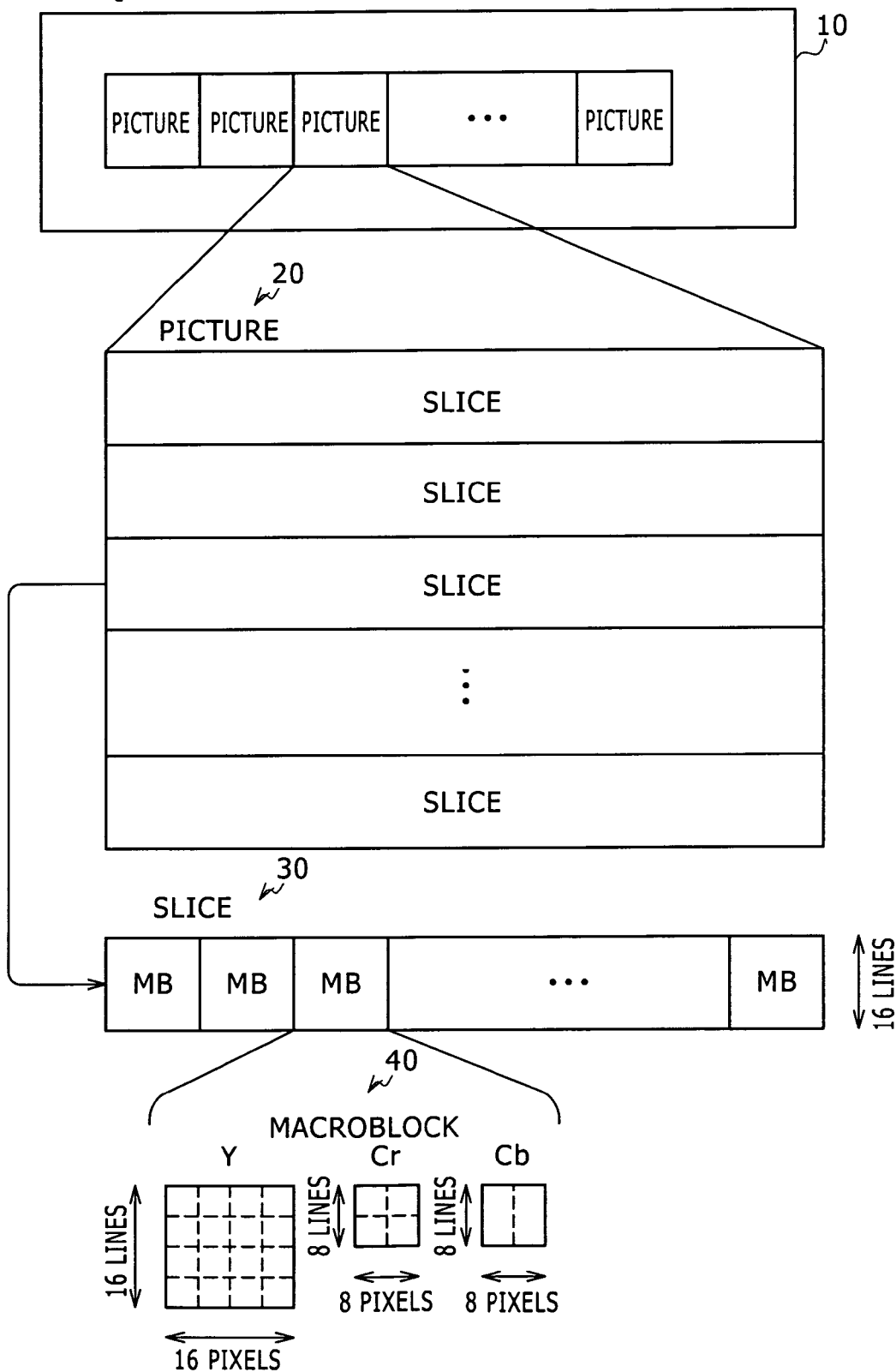
FIG. 3 illustrates an outline of a data structure in H.264.

FIG. 3 illustrates an outline of a data structure in H.264. In H.264, a sequence of encoded data can be broadly divided into four layers: a sequence layer, a picture layer, a slice layer, and a macroblock layer.

Each picture 20 included in the sequence layer represents an image. The picture 20 is divided into a plurality of slices 30. Each slice 30 is composed of 16 lines of the picture 20.

Each slice 30 is composed of a plurality of macroblocks 40. Each macroblock 40 is image data corresponding to a screen area of 16 (lines) by 16 pixels, and contains a brightness signal Y of 16 (lines) by 16 pixels, a color-difference signal Cr of 8 (lines) by 8 pixels, and a color-difference signal Cb of 8 (lines) by 8 pixels. Each macroblock 40 is divided into blocks of 4 (lines) by 4 pixels as a DCT processing unit.

Figure 4:
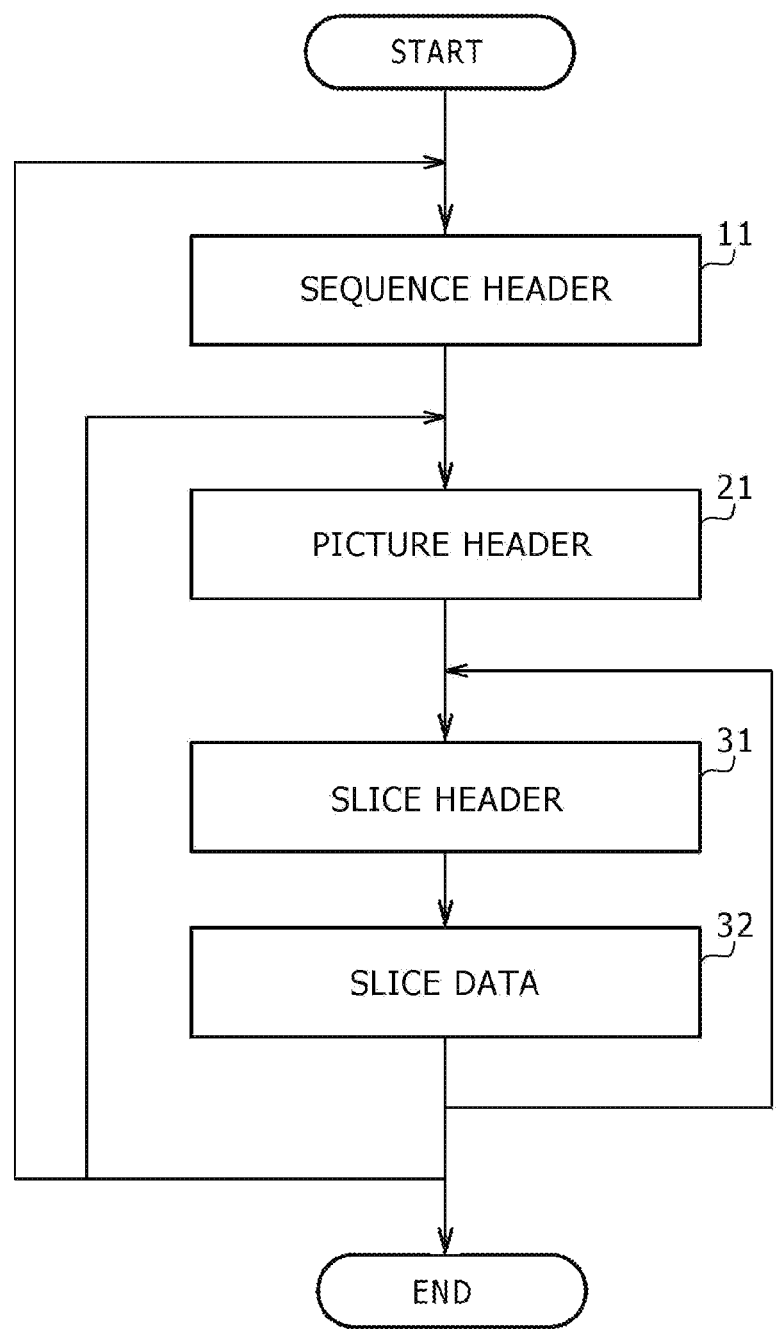
FIG. 4 illustrates a basic structure of a stream in H.264.

FIG. 4 illustrates a basic structure of a stream in H.264. On the level of the sequence layer, a sequence header 11 is followed by sequence data. On the level of the picture layer, a picture header 21 is followed by picture data. On the level of the slice layer, a slice header 31 is followed by slice data 32. The sequence data can include a plurality of pictures, and the picture data can include a plurality of slices.

Figure 5:
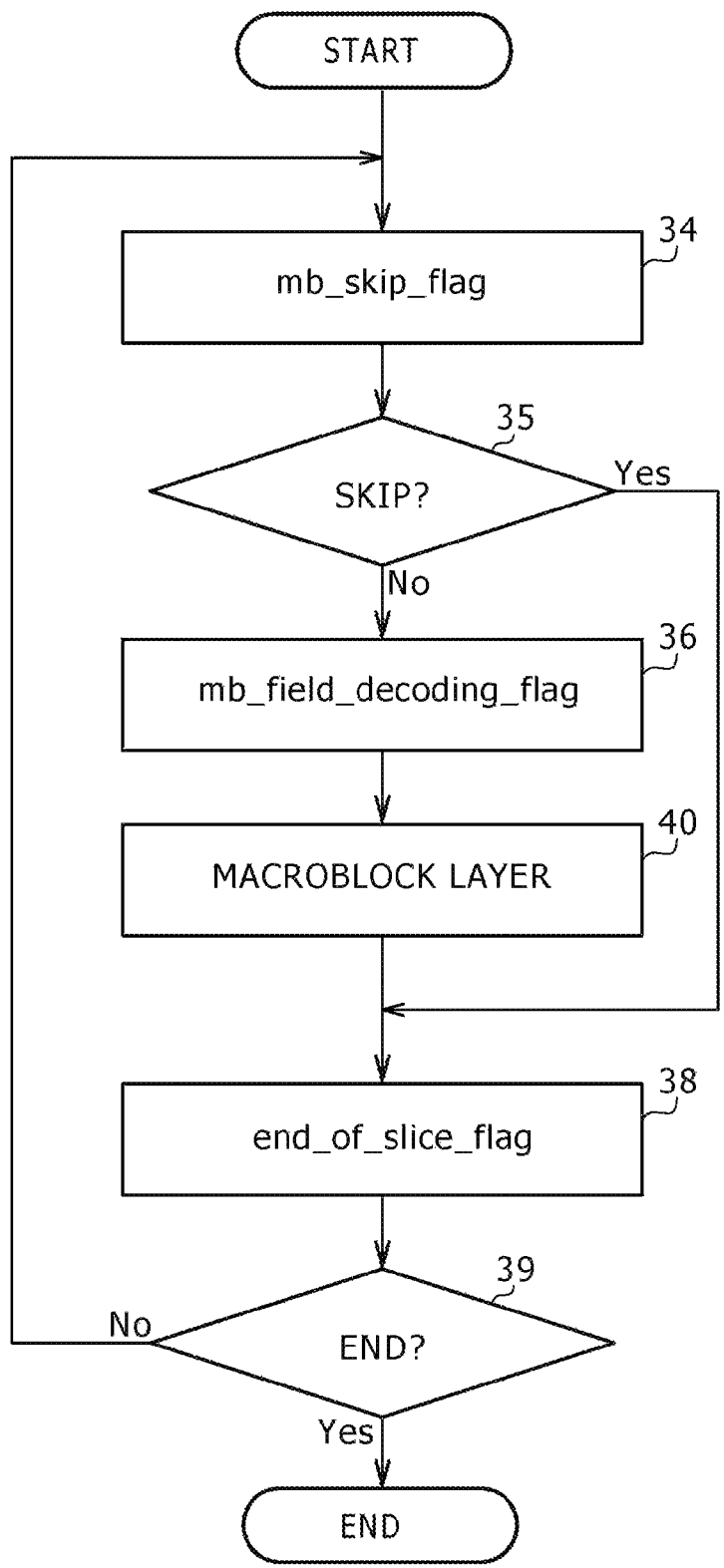
FIG. 5 illustrates a basic structure of slice data in H.264.

FIG. 5 illustrates a basic structure of the slice data 32 in H.264. Syntax elements equal to or below the slice data 32 are CABAC decoded.

Here, a syntax element mb_skip_flag 34 is present at the top of the slice data 32. The syntax element mb_skip_flag is a flag indicating whether or not the macroblock layer is to be referred to. If the syntax element mb_skip_flag is "1," a subsequent syntax element mb_field_decoding_flag 36 and a subsequent macroblock layer 40 are skipped (35). Meanwhile, if the syntax element mb_skip_flag is "0," the syntax element mb_field_decoding_flag 36 and the macroblock layer 40 are decoded, instead of being skipped.

The syntax element mb_field_decoding_flag 36 indicates whether two fields should be handled as two independent pictures or whether they should be integrated into a frame and handled as such. If the syntax element mb_field_decoding_flag 36 is "1," the two fields are handled as two independent pictures, whereas if the syntax element mb_field_decoding_flag 36 is "0," the two fields are integrated into a frame and handled as such.

A syntax element end_of_slice_flag 38 is a flag indicating an end of the slice data 32. If the syntax element end_of_slice_flag 38 is "1," it means that there is no more macroblock in the present slice, whereas if the syntax element end_of_slice_flag 38 is "0," it means that there is a further macroblock in the present slice (39).

Figure 6:
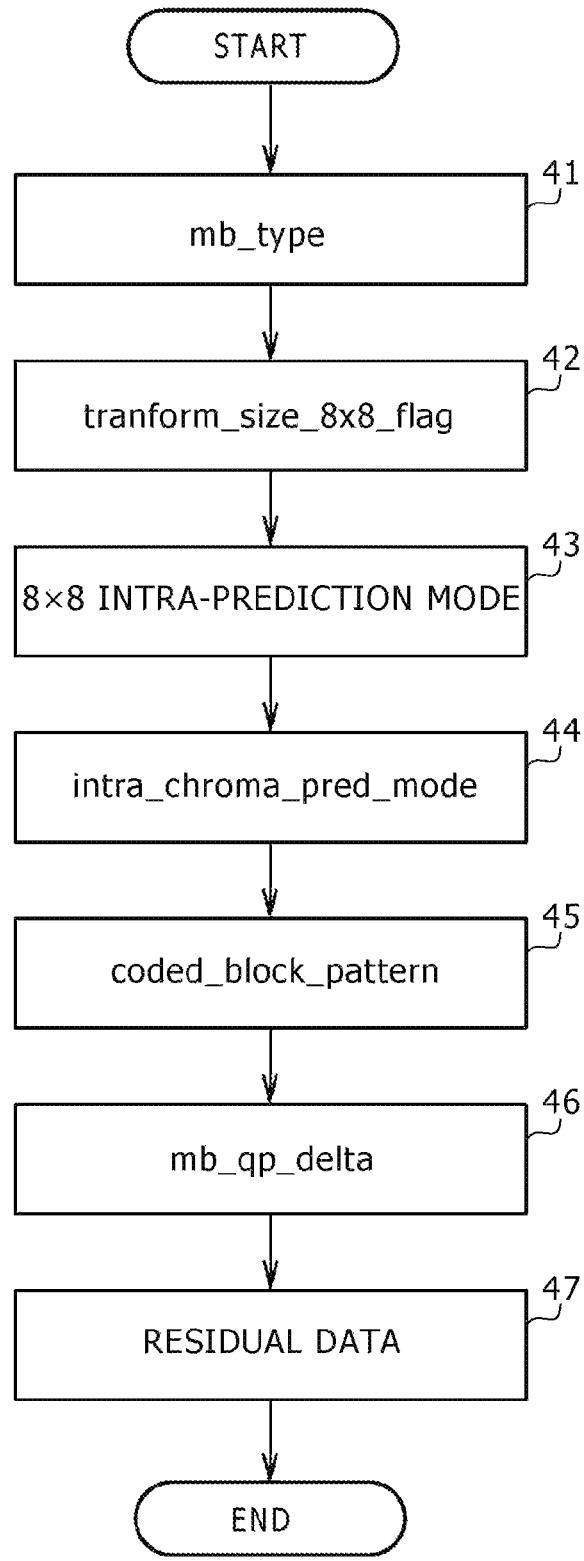
FIG. 6 illustrates a basic structure of a macroblock layer in H.264.

FIG. 6 illustrates a basic structure of the macroblock layer 40 in H.264. Here, the case of intra-prediction of 8×8 pixels will be described by way of example. The intra-prediction refers to predicting an image using an image at a different position in the same screen.

Here, a syntax element mb_type 41 is present at the top of the macroblock layer 40. The syntax element mb_type 41 specifies the macroblock type. The macroblock type varies depending on the type of a slice to which the macroblock belongs. In this example, the macroblock belongs to an I-slice, and the syntax element mb_type 41 indicates "0," that is, I_N×N.

A syntax element transform_size_8×8_flag 42 indicates a DCT size of this macroblock. If the syntax element transform_size_8×8_flag 42 is "1," it means that the DCT size of this macroblock is 8×8 pixels, whereas if the syntax element transform_size_8×8_flag 42 is "0," it means that the DCT size of this macroblock is 4×4 pixels.

An 8×8 intra-prediction mode 43 specifies an intra-screen prediction mode for each of the 8×8 pixel blocks included in this macroblock.

A syntax element intra_chroma_pred_mode 44 specifies the intra-screen prediction mode for the color-difference signal for this macroblock. Specifically, the syntax element intra_chroma_pred_mode 44 indicates "0" when the prediction mode is a direct current (DC) mode, "1" when the prediction mode is a horizontal mode, "2" when prediction mode is a vertical mode, and "3" when the prediction mode is a plane mode.

A syntax element coded_block_pattern 45 indicates whether or not each block included in this macroblock includes a non-zero DCT coefficient.

A syntax element mb_qp_delta 46 represents a difference in quantization parameter QP between this macroblock and an immediately previous macroblock. In the case where there is not an immediately previous macroblock, the syntax element mb_qp_delta 46 indicates "0."

Residual data 47 represents a remainder of the encoded data from which predicted data has been subtracted. In H.264, the residual data 47 is subjected to DCT and quantization, and then encoded.

FIG. 7 illustrates values of the conditional flag generation function CondTerm(SE) according to this embodiment of the present invention. In H.264, the algorithm for generating the conditional flag based on the value of the syntax element includes the complicated determination process as described above. In this embodiment of the present invention, taking advantage of the fact that most syntax elements can be represented by a logical expression of only a top of a decoded bit sequence, this is used to generate the conditional flag. Here, the top of the decoded bit sequence is represented as "bin0."

The value of the conditional flag generation function CondTerm(SE) is "bin0" for mb_field_decoding_flag, mb_type, transform_size_8×8_flag, intra_chroma_pred_mode, and coded_block_pattern, of all the syntax elements. Meanwhile, the value of the conditional flag generation function CondTerm(SE) is an inverse value of "bin0" for mb_skip_flag.

Meanwhile, for mb_qp_delta, the value of the conditional flag generation function CondTerm(SE) is "1" if mb_qp_delta is not zero, or "0" if mb_qp_delta is zero.

In the case where the syntax element is not decoded within the macroblock, a value corresponding to that condition is stored in the adjacent macroblock information storage section 120. The value in this case is fixed for each syntax element. The fixed value is "1" for mb_skip_flag, and "0" for the other syntax elements.

As described above, in the case where the syntax element is decoded, bits that are being decoded, instead of the syntax element decoded completely, are used as the value of the conditional flag generation function CondTerm(SE). Meanwhile, in the case where the syntax element is not decoded, the fixed value is set therein. Thus, the conditional flag generation function CondTerm(SE) can be implemented by a very simple algorithm.

Figure 8:
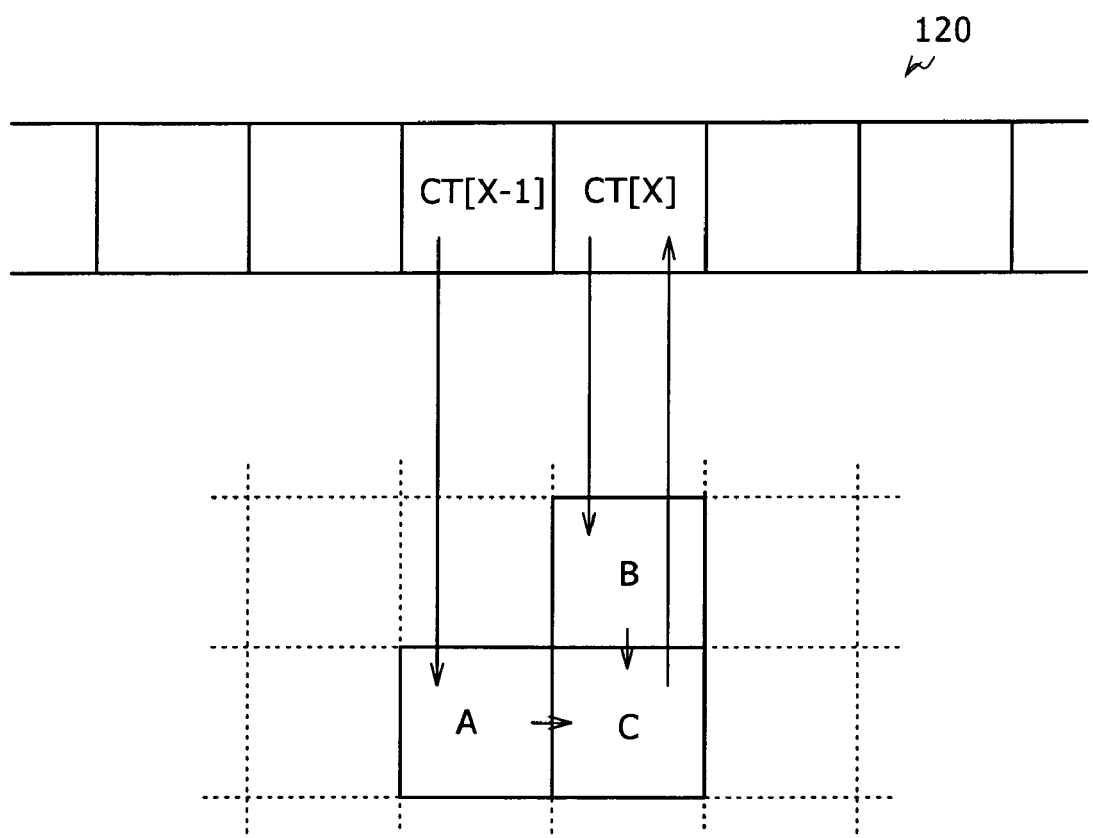
FIG. 8 illustrates a relationship between the adjacent macroblock information storage section and macroblocks, according to an embodiment of the present invention.

FIG. 8 illustrates a relationship between the adjacent macroblock information storage section 120 and the macroblocks, according to this embodiment of the present invention.

When the context index increment is generated in the context index increment generation section 130, an address X of the target macroblock (position C) is calculated. Then, based on the address X, CT[X−1] and CT[X] are read from the adjacent macroblock information storage section 120. CT[X−1] represents the conditional flag for the left macroblock (position A), and CT[X] represents the conditional flag for the upper macroblock (position B).

After the decoding process in the CABAC decoding section 160, the conditional flag for position C is generated by the CondTerm generation section 170 (FIG. 7), and CT[X] in the adjacent macroblock information storage section 120 is overwritten with a value of the generated conditional flag. Thus, the number of executions of the conditional flag generation function can be nearly halved.

Figure 9:
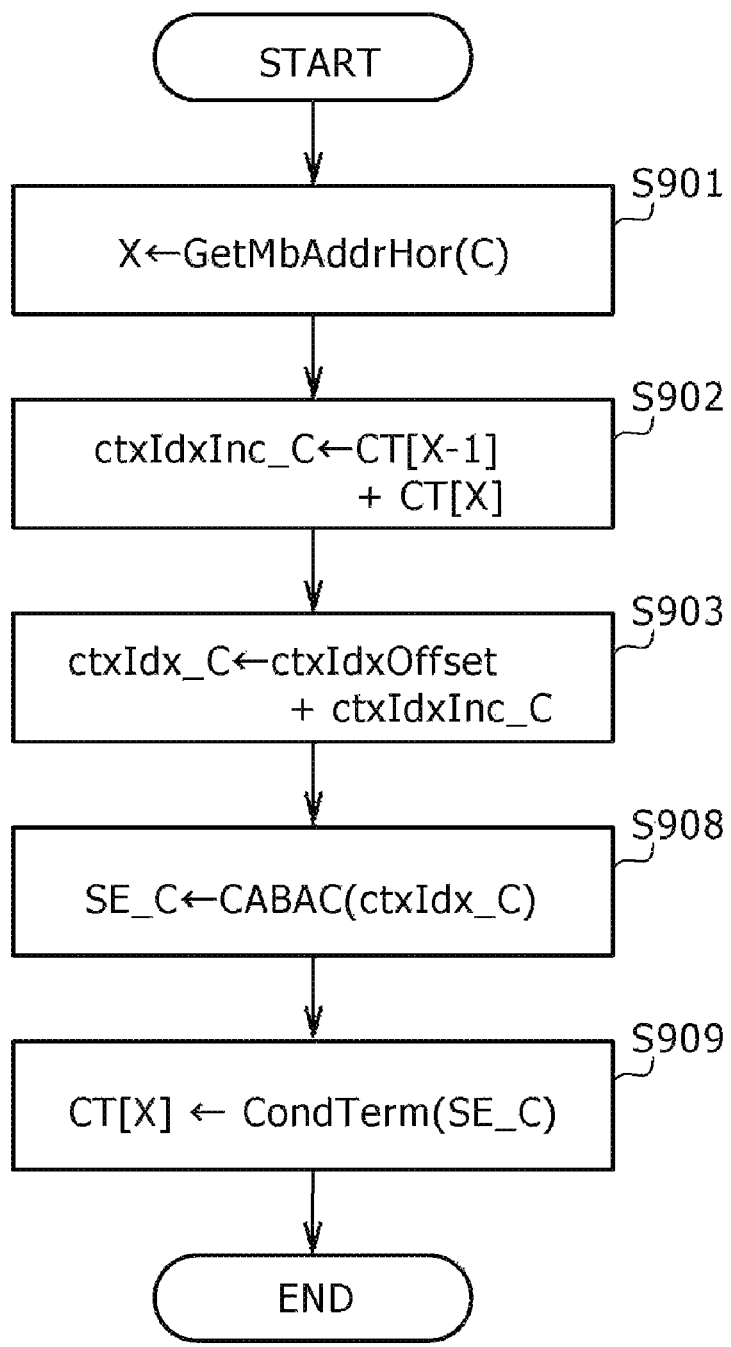
FIG. 9 illustrates an exemplary procedure performed by the decoding apparatus according to the first embodiment of the present invention.

FIG. 9 illustrates an exemplary procedure performed by the decoding apparatus according to the first embodiment of the present invention.

The context index increment generation section 130 calculates the address X of the target macroblock (position C) (step S901). Then, the context index increment generation section 130 reads CT[X−1] and CT[X] from the adjacent macroblock information storage section 120, and adds them together to generate the context index increment (ctxIdxInc_C) for position C (step S902).

The context index calculation section 150 adds the context index offset, which is defined for each type of the syntax element, to the context index increment generated at step S902 to calculate the context index (ctxIdx_C) for position C (step S903).

The CABAC decoding section 160 decodes the input data based on the context index calculated at step S903, and outputs the syntax element for position C (step S908). In addition, the CondTerm generation section 170 generates a value of the conditional flag generation function CondTerm(SE_C) based on a result of the decoding by the CABAC decoding section 160, and overwrites CT[X] in the adjacent macroblock information storage section 120 with the generated value of the conditional flag generation function CondTerm(SE_C) (step S909).

According to the procedure as described above, it is possible to generate the conditional flag, without the need for the determination process as demanded in related art. Specific processes for the macroblocks are as follows.

First, suppose that the target macroblock is a first macroblock in a frame. A horizontal address of this macroblock is "0." In relation to this macroblock, information about a left macroblock that is to be referred to and information about an upper macroblock that is to be referred to are both invalid. In this embodiment of the present invention, the process of determining the position of the macroblock within the frame is not performed, but CT[0] and CT[−1] in the adjacent macroblock information storage section 120 are referred to. At this time, as a result of the initialization, all the values in the adjacent macroblock information storage section 120 have been set to the value indicating invalidity. Therefore, simply referring to CT[0] and CT[−1] is sufficient. Furthermore, because the index is extended to "−1," reference to a special address "−1" does not pose a problem. Thereafter, the context index increment is generated based on the values referred to, the syntax element is decoded, and the calculated value of CondTerm(SE) is set in CT[0] in the adjacent macroblock information storage section 120.

Next, suppose that the target macroblock is a second macroblock (i.e., a right neighbor of the first macroblock) in the frame. The horizontal address of this macroblock is "1." In relation to this macroblock, information about an upper macroblock that is to be referred to is invalid. In this embodiment of the present invention, the process of determining the position of the macroblock within the frame is not performed, but CT[1] and CT[0] in the adjacent macroblock information storage section 120 are referred to. At this time, the value of CT[1] corresponding to the upper macroblock that is to be referred to has been initialized to the value indicating invalid macroblock information. Meanwhile, the value of CT[0] corresponding to the left macroblock that is to be referred to has been updated to the value of the left macroblock already decoded. Therefore, with respect to this macroblock also, simply referring to the values in the adjacent macroblock information storage section 120 is sufficient. Similar processes are applied to the other uppermost macroblocks in the frame.

Next, suppose that the target macroblock is a first macroblock in a second row. The horizontal address of this macroblock is "0." In relation to this macroblock, information about a left macroblock that is to be referred to is invalid. In this embodiment of the present invention, the process of determining the position of the macroblock within the frame is not performed, but CT[0] and CT[−1] in the adjacent macroblock information storage section 120 are referred to. At this time, the value of CT[0] corresponding to the upper macroblock that is to be referred to has been updated to the value of the upper macroblock already decoded. Meanwhile, the value of CT[−1] corresponding to the left macroblock that is to be referred to is still the initial value. Therefore, with respect to this macroblock also, simply referring to the values in the adjacent macroblock information storage section 120 is sufficient.

As described above, according to the first embodiment of the present invention, for each of all the macroblocks, the context index increment can be generated by the context index increment generation section 130 by referring to the values in the adjacent macroblock information storage section 120, without the need to perform the process of determining the position of the macroblock.

Next, a second embodiment of the present invention will now be described below. While the first embodiment described above assumes use of the CABAC coding system, the second embodiment assumes use of the CAVLC coding system.

Figure 10:
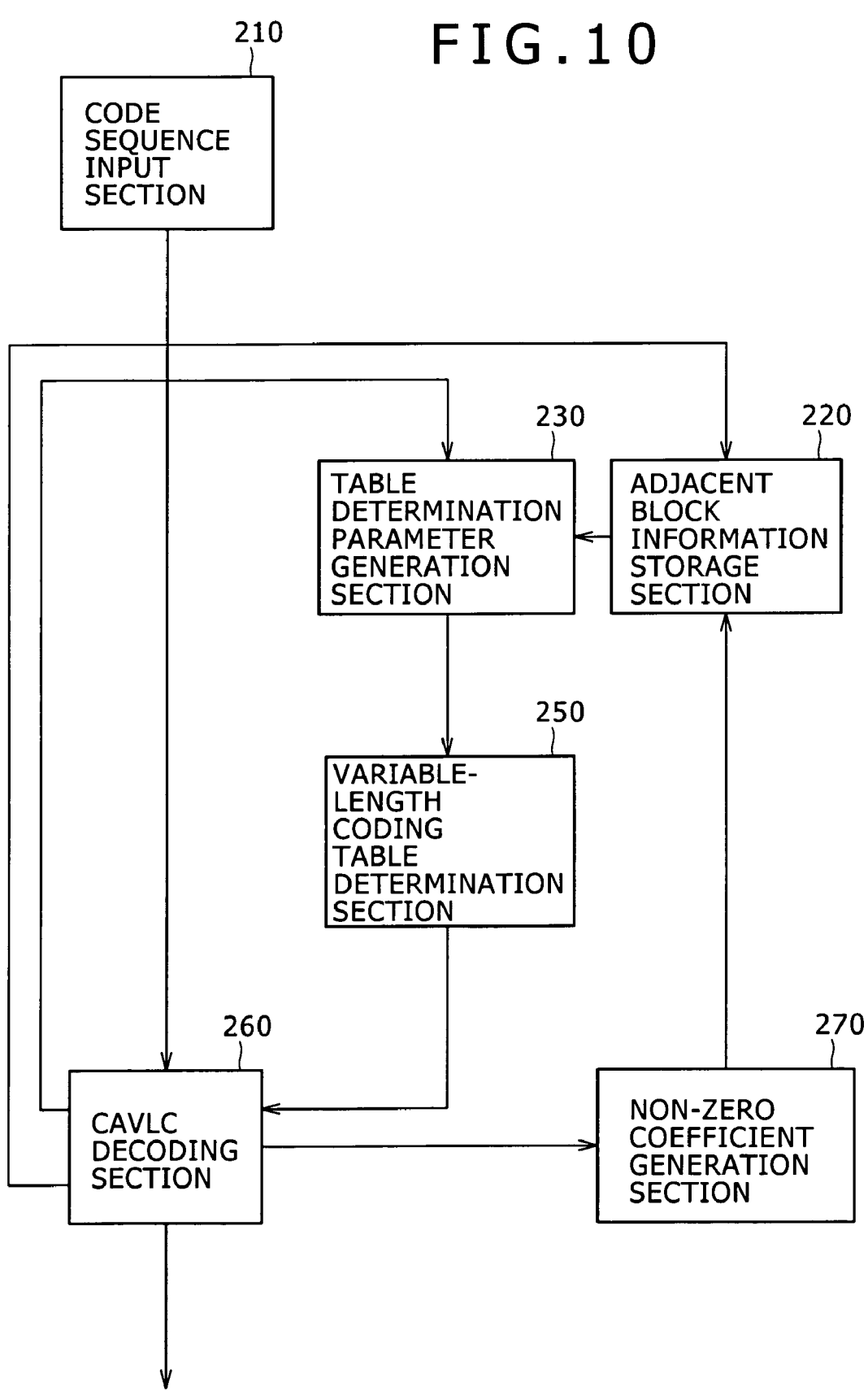
FIG. 10 illustrates an exemplary functional structure of a decoding apparatus according to a second embodiment of the present invention.

FIG. 10 illustrates an exemplary functional structure of a decoding apparatus according to the second embodiment of the present invention. This decoding apparatus includes a code sequence input section 210, an adjacent block information storage section 220, a table determination parameter generation section 230, a variable-length coding table determination section 250, a CAVLC decoding section 260, and a non-zero coefficient generation section 270.

The code sequence input section 210 inputs, as input data, a code sequence encoded in accordance with the CAVLC coding system. The input data as inputted via the code sequence input section 210 is supplied to the CAVLC decoding section 260.

The adjacent block information storage section 220 stores, as block information, information concerning adjacent blocks of a target block. As described above, in H.264, each frame is divided into the macroblocks, each of which represents a block of 16 (lines) by 16 pixels, and a DCT coefficient quantized in a block of 4 (lines) by 4 pixels within the macroblock is decoded. In the CAVLC coding system, when a variable-length coding table used for performing variable-length coding (VLC) is adaptively selected, the number of non-zero coefficients among DCT coefficients quantized in a block to the left of a target block and the number of non-zero coefficients among DCT coefficients quantized in a block above the target block are needed. The adjacent block information storage section 220 stores these numbers of non-zero coefficients as the block information.

The structure of the adjacent block information storage section 220 is similar to that of the adjacent macroblock information storage section 120 as described above with reference to FIG. 2. However, it is not necessary that the adjacent block information storage section 220 be provided for each syntax element. When a decoding process for a new frame is started, and when a decoding process for a new slice is started, values in the adjacent block information storage section 220 are initialized to a value indicating invalid block information. This eliminates the need for a process of determining the position of a target block, i.e., a block that is to be decoded, and the need for a process of determining whether or not a block that is to be referred to is included in the same slice as the target block.

The table determination parameter generation section 230 reads, from the adjacent block information storage section 220, the number of non-zero coefficients among the DCT coefficients quantized for the left block and the number of non-zero coefficients among the DCT coefficients quantized for the upper block, and, based on them, generates a parameter for selecting the variable-length coding table. Specifically, the parameter nC is given by the following equation: nC=(nA+nB+1)>>1, where nA is the number of non-zero coefficients for the left block (position A) relative to the target block (position C), nB is the number of non-zero coefficients for the upper block (position B) relative to the target block (position C), and ">>1" means that a numerical value on the left side is shifted to the right by one bit. That is, nC is obtained as the average (an integer) of nA and nB.

The variable-length coding table determination section 250 determines the variable-length coding table based on the parameter nC generated in the table determination parameter generation section 230. Specifically, the variable-length coding table is determined in the following manner:

0≦nC<2; table *A*

2≦nC<4; table *B*

4≦nC<8; table *C*

8≦nC; table *D*

The CAVLC decoding section 260 decodes the input data supplied from the code sequence input section 210, based on the variable-length coding table determined by the variable-length coding table determination section 250.

The non-zero coefficient generation section 270 generates the number of non-zero coefficients among DCT coefficients quantized for the target block (position C), based on a result of the decoding performed by the CAVLC decoding section 260. The number of non-zero coefficients generated by the non-zero coefficient generation section 270 is stored in the adjacent block information storage section 220. Note that in the case where an adjacent block has not been decoded, the number of non-zero coefficients should be "0." As a result, information about a block that has not been decoded at the time of the decoding is updated to "0."

Figure 11:
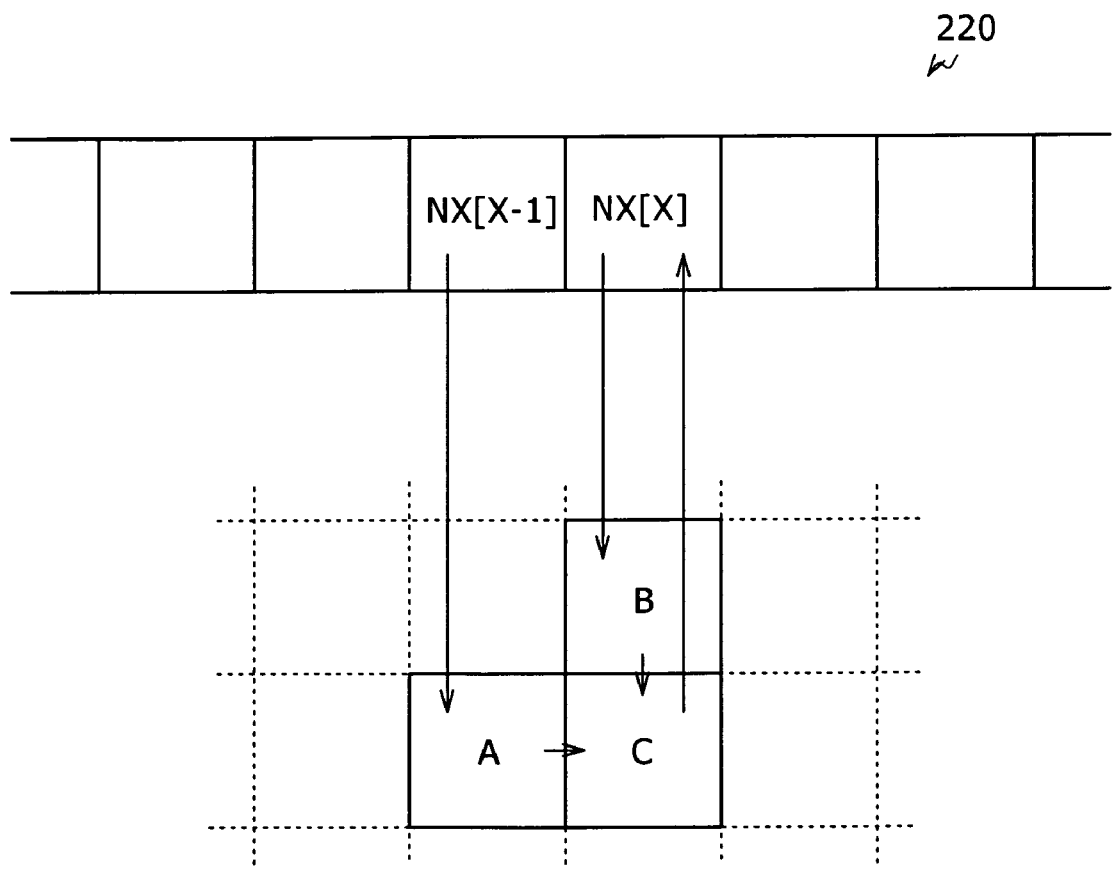
FIG. 11 illustrates a relationship between an adjacent block information storage section and blocks, according to an embodiment of the present invention.

FIG. 11 illustrates a relationship between the adjacent block information storage section 220 and the blocks, according to this embodiment of the present invention.

When the variable-length coding table is determined in the variable-length coding table determination section 250, an address X of the target block (position C) is calculated. Then, based on this address X, NX[X−1] and NX[X] are read from the adjacent block information storage section 220. Here, NX[X−1] represents the number of non-zero coefficients for the left block (position A), and NX[X] represents the number of non-zero coefficients for the upper block (position B).

After the decoding process in the CAVLC decoding section 260, the number of non-zero coefficients for position C is generated by the non-zero coefficient generation section 270, and NX[X] in the adjacent block information storage section 220 is overwritten with the generated number of non-zero coefficients. Thus, the number of instances of generating the number of non-zero coefficients can be nearly halved.

Figure 12:
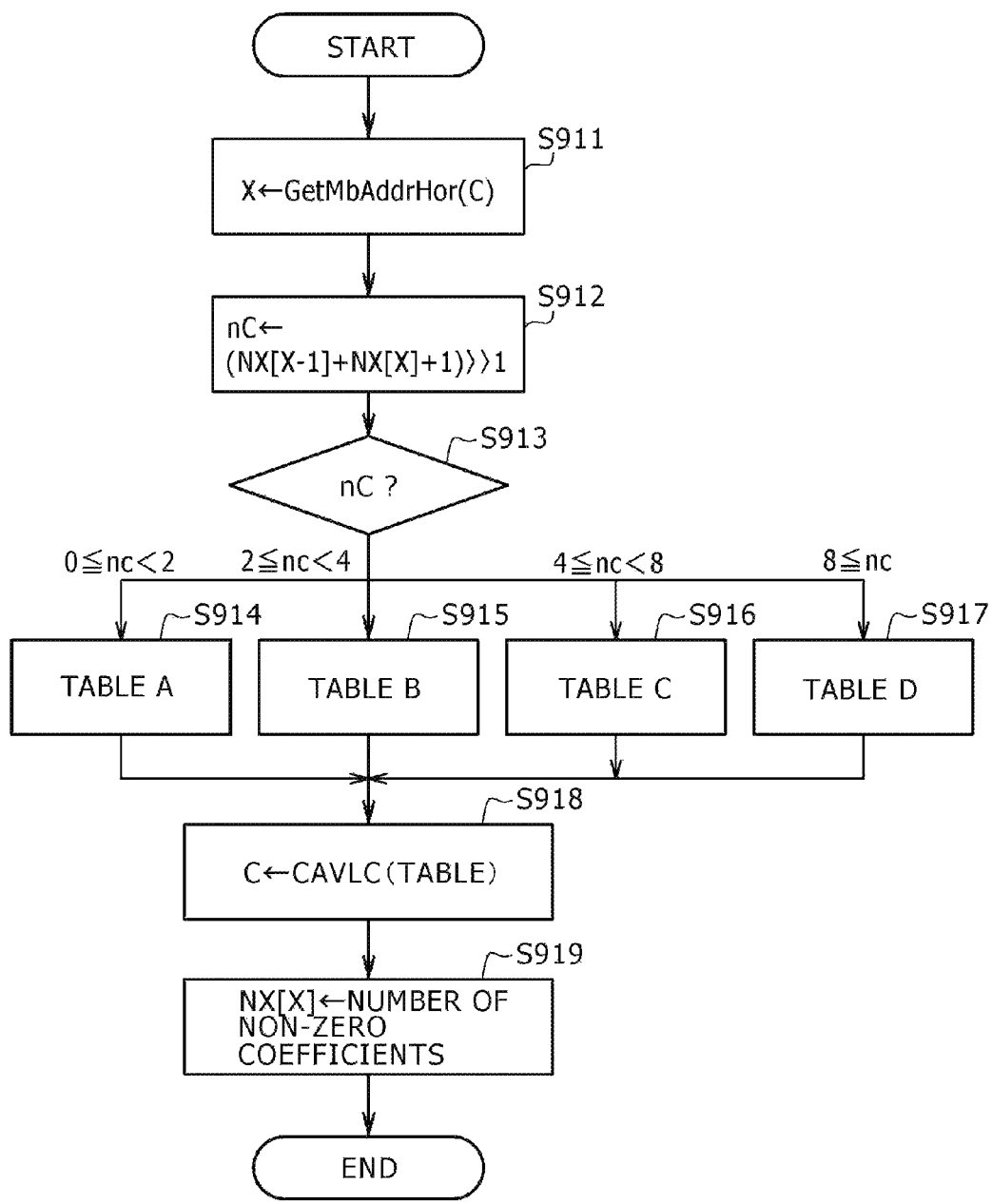
FIG. 12 illustrates an exemplary procedure performed by the decoding apparatus according to the second embodiment of the present invention.
Figure 13A:
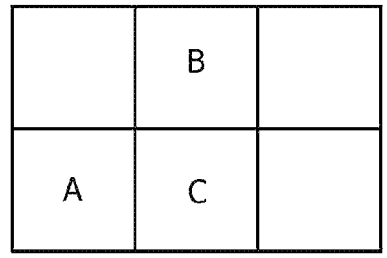
FIGS. 13A, 13B, 13C, and 13D illustrate relative positions of the macroblocks.
Figure 13B:
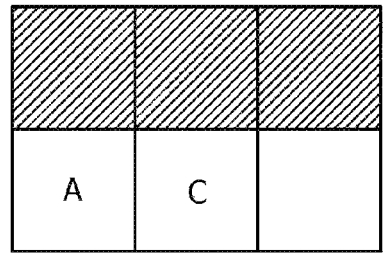
Figure 13C:
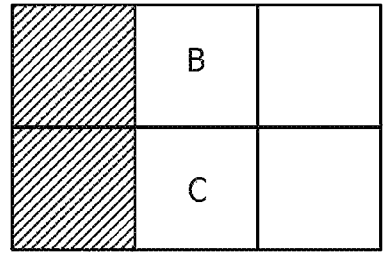
Figure 13D:
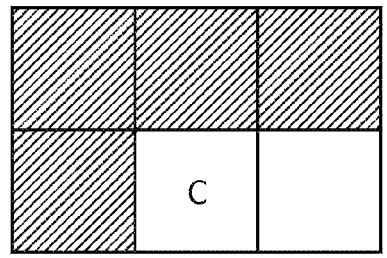
Figure 14:
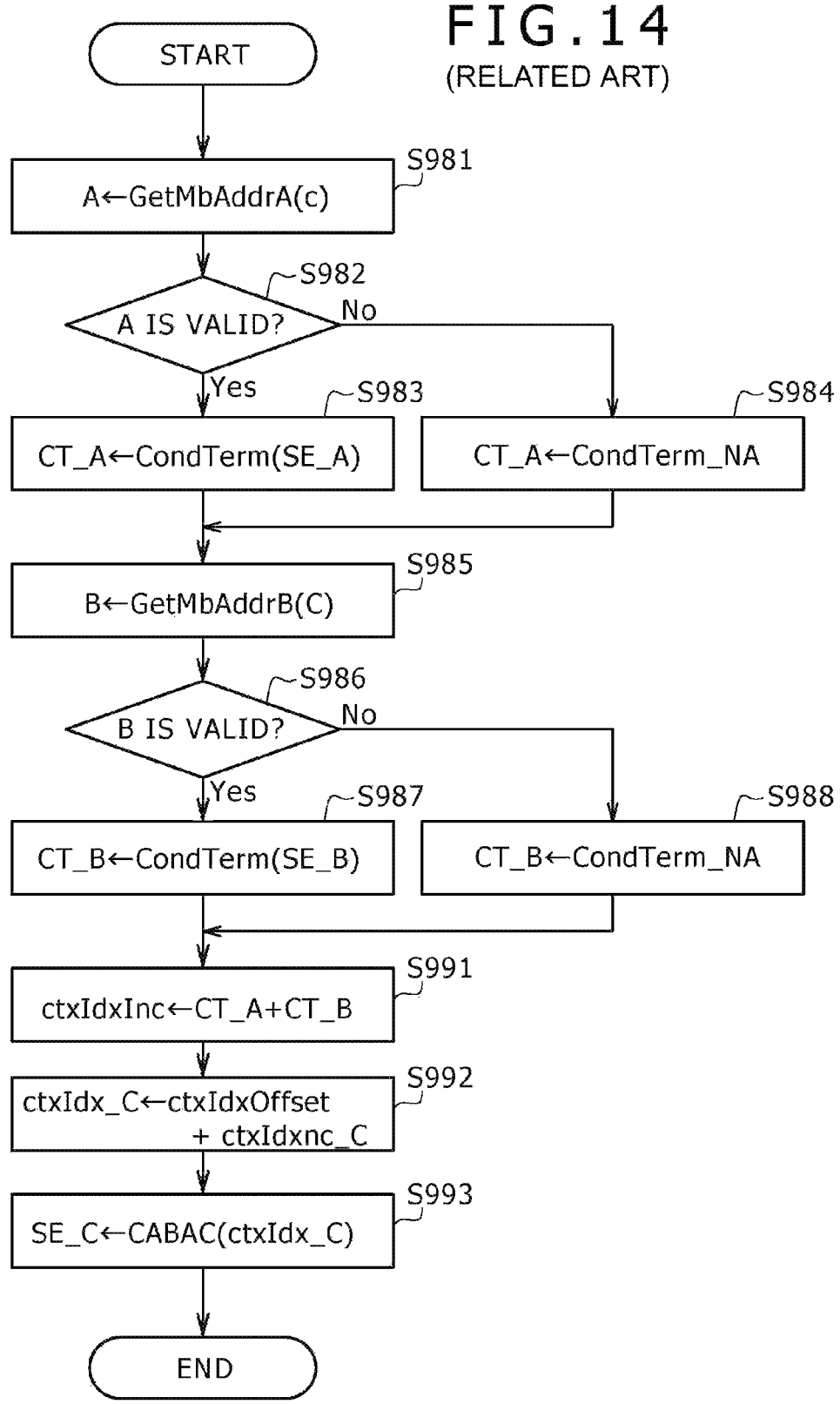
FIG. 14 illustrates an exemplary procedure in the CABAC coding system.
Figure 15:
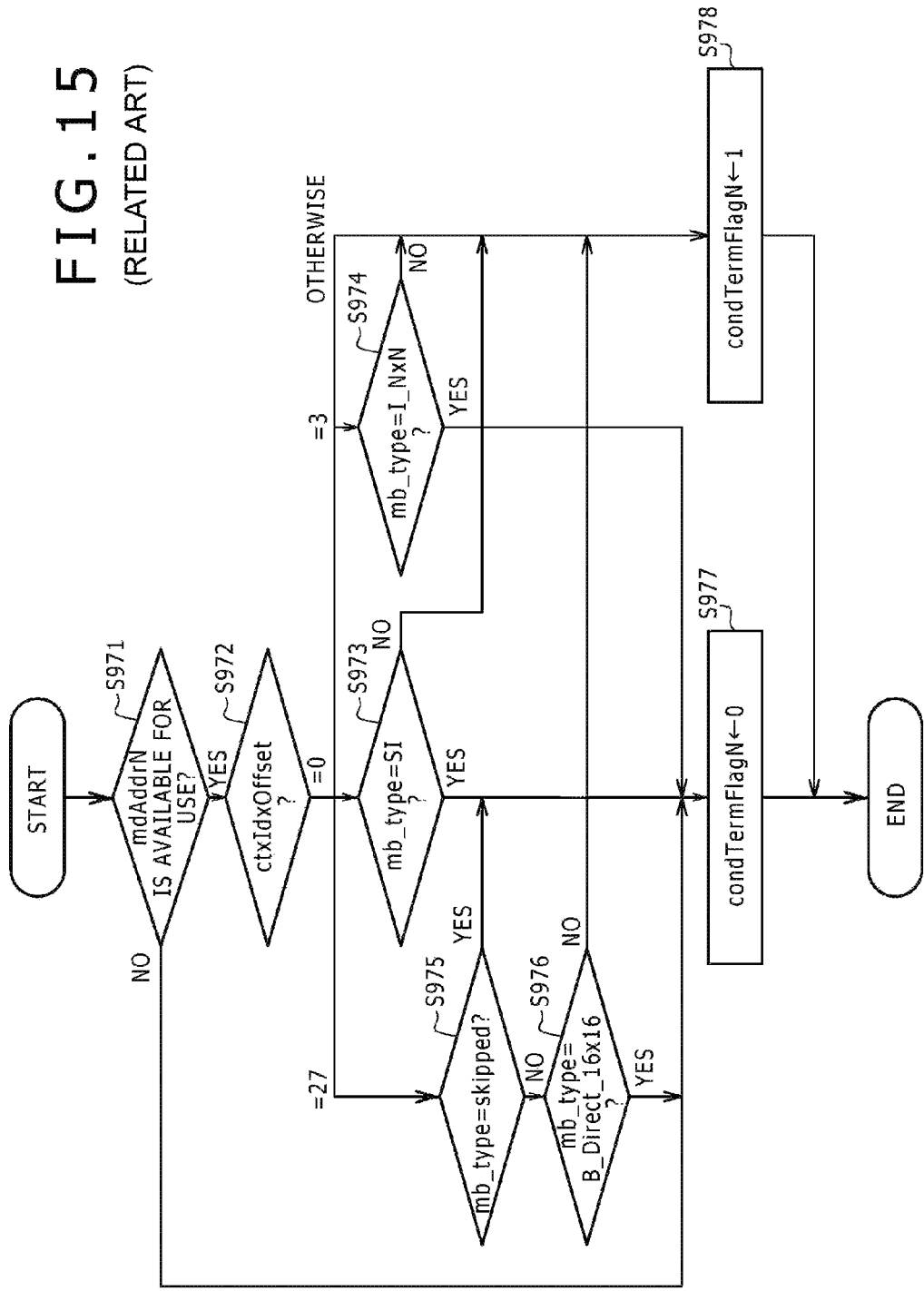
FIG. 15 illustrates an exemplary procedure for CondTerm(SE) for a macroblock type.
Figure 16:
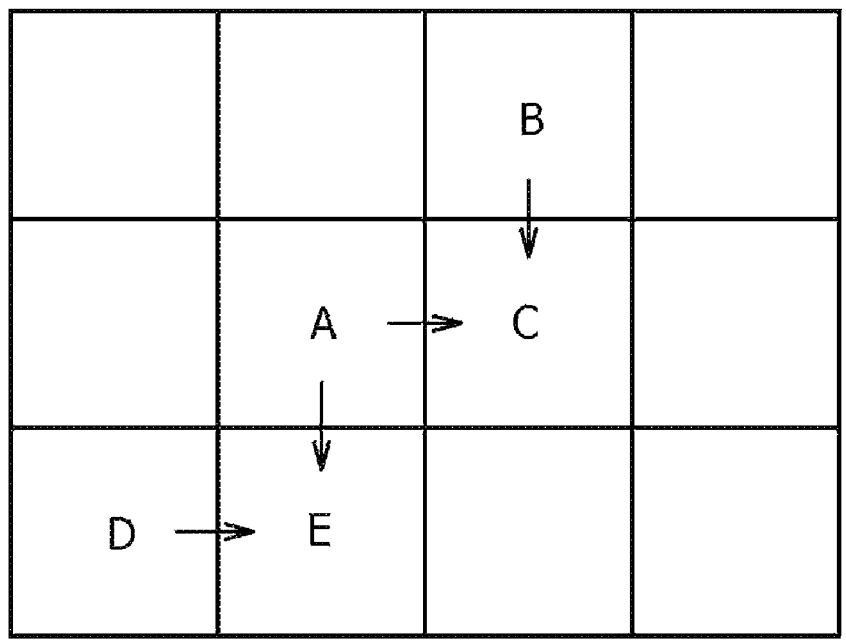
FIG. 16 illustrates how CondTerm(SE) is executed twice.

FIG. 12 illustrates an exemplary procedure performed by the decoding apparatus according to the second embodiment of the present invention.

The table determination parameter generation section 230 calculates the address X of the target block (position C) (step S911). Then, the table determination parameter generation section 230 reads NX[X−1] and NX[X] from the adjacent block information storage section 220, adds 1 to the sum of NX[X−1] and NX[X] and shifts a result to the right by one bit to generate the parameter nC for selecting the variable-length coding table (step S912).

The variable-length coding table determination section 250 determines the variable-length coding table in accordance with the parameter nC (steps S913, S914, S915, S916, and S917). Based on the variable-length coding table determined in the above-described manner, the CAVLC decoding section 260 decodes the input data supplied from the code sequence input section 210 (step S918). Based on the result of the decoding, the non-zero coefficient generation section 270 generates the number of non-zero coefficients among the DCT coefficients quantized for the target block (position C), and overwrites NX[X] in the adjacent block information storage section 220 with the generated number of non-zero coefficients (step S919).

As described above, according to the second embodiment of the present invention, for each of all the blocks, the variable-length coding table can be determined in the variable-length coding table determination section 250 by referring to the values in the adjacent block information storage section 220, without the need to perform the process of determining the position of the block.

Specific embodiments of the present invention have been described above. When the CABAC decoding process is performed, 20 to 30 syntax elements appear for non-skipped macroblocks. In the process of decoding such syntax elements, both the need to perform the process of determining the position of the decoding target macroblock (i.e., checking whether or not the decoding target macroblock is a leftmost or uppermost macroblock) and the need to perform the process of determining whether or not the macroblock that is to be referred to is included in the same slice as the target macroblock are eliminated. In the case where the method of the processing according to this embodiment of the present invention is implemented as a program (software) for a common processor, the number of branching processes per macroblock is reduced by 60 to 90. Thus, a reduction in the number of cycles of program execution and code size is achieved. Meanwhile, in the case where the method of the processing according to this embodiment of the present invention is implemented as hardware, circuits for the determination processes can be reduced. The same is true with the case of the CAVLC decoding process.

Moreover, the process of calculating the value of CondTerm(SE) is performed at the same time as the CABAC decoding, or the process of generating the number of non-zero coefficients among the quantized DCT coefficients is performed at the same time as the CAVLC decoding. This contributes to simplifying a calculation algorithm and reducing the number of instances of the calculation process. Thus, the aforementioned effects will be additionally increased when this method is implemented in software or hardware.

Note that the foregoing description of the embodiments of the present invention is in all modes illustrative and not restrictive. Components of the above-described embodiments of the present invention correspond to inventive features as recited in the appended claims as described below.

Regarding claim 1, pixel group information storage means corresponds to the adjacent macroblock information storage section 120 or the adjacent block information storage section 220, for example. Decoding information generation means corresponds to the context index increment generation section 130, or the table determination parameter generation section 230 and the variable-length coding table determination section 250, for example. Decoding means corresponds to the CABAC decoding section 160 or the CAVLC decoding section 260, for example. Pixel group information update means corresponds to the CondTerm generation section 170 or the non-zero coefficient generation section 270, for example.

Regarding claim 4, macroblock information storage means corresponds to the adjacent macroblock information storage section 120, for example. Context index increment generation means corresponds to the context index increment generation section 130, for example. Decoding means corresponds to the CABAC decoding section 160, for example. Macroblock information update means corresponds to the CondTerm generation section 170, for example.

Regarding claim 5, block information storage means corresponds to the adjacent block information storage section 220, for example. Variable-length coding table determination means corresponds to the table determination parameter generation section 230 and the variable-length coding table determination section 250, for example. Decoding means corresponds to the CAVLC decoding section 260, for example. Block information update means corresponds to the non-zero coefficient generation section 270, for example.

Regarding claims 6 and 7, pixel group information storage means corresponds to the adjacent macroblock information storage section 120 or the adjacent block information storage section 220, for example. Step a) corresponds to step S902 or S912, for example. Step b) corresponds to step S908 or S918, for example. Step c) corresponds to step S909 or S919, for example.

Note that the above-described procedures in the embodiments of the present invention described above may be viewed as a method having corresponding series of steps, and also may be viewed as a program for causing a computer to execute the series of steps or as a storage medium that stores the program.

It should be understood by those skilled in the art that various modifications, combinations, sub-combinations and alterations may occur depending on design requirements and other factors insofar as they are within the scope of the appended claims or the equivalents thereof.

What is claimed is:

1. A decoding apparatus, comprising:
   pixel group information storage means including
   a plurality of memory areas each of which stores, as pixel group information, information concerning a corresponding pixel group and is referred to with a horizontal address of the pixel group in a frame, and
   an additional memory area that is located at a left end of the plurality of memory areas and stores a value that indicates invalid pixel group information;
   decoding information generation means for acquiring the pixel group information stored in memory areas identified by an address of a pixel group that is to be decoded and an address to an immediate left of that address, and generating, as decoding information, information that is necessary for decoding of the pixel group that is to be decoded;
   decoding means for performing a decoding process based on the decoding information; and
   pixel group information update means for generating pixel group information concerning the pixel group that is to be decoded based on a value based on the decoding information, and allowing the generated pixel group information to be stored in the memory area in said pixel group information storage means that is identified by the address of the pixel group that is to be decoded to update the pixel group information.

2. The decoding apparatus according to claim 1, wherein, when a decoding process for a new frame is started, said pixel group information storage means is initialized to the value that indicates the invalid pixel group information.

3. The decoding apparatus according to claim 2, wherein, when a decoding process for a new slice is started, said pixel group information storage means is initialized to the value that indicates the invalid pixel group information.

4. A decoding apparatus, comprising:
   macroblock information storage means including
   a plurality of memory areas each of which stores, as macroblock information, a conditional flag used for generating a context index increment for a corresponding macroblock and is referred to with a horizontal address of the macroblock in a frame, and
   an additional memory area that is located at a left end of the plurality of memory areas and stores a value that indicates invalid macroblock information;
   context index increment generation means for generating the context index increment based on the conditional flags stored in memory areas identified by an address of a macroblock that is to be decoded and an address to an immediate left of that address;

decoding means for performing a context adaptive binary arithmetic coding decoding process based on a context index calculated based on the context index increment; and macroblock information update means for generating the conditional flag concerning the macroblock that is to be decoded based on a value obtained as a result of the decoding process, and allowing the generated conditional flag to be stored in the memory area in said macroblock information storage means that is identified by the address of the macroblock that is to be decoded to update the conditional flag.

5. A decoding method employed in a decoding apparatus that has pixel group information storage means including a plurality of memory areas each of which stores, as pixel group information, information concerning a corresponding pixel group and is referred to with a horizontal address of the pixel group in a frame, and an additional memory area that is located at a left end of the plurality of memory areas and stores a value that indicates invalid pixel group information, the decoding method comprising the steps of:

a) acquiring the pixel group information stored in memory areas identified by an address of a pixel group that is to be decoded and an address to an immediate left of that address, and generating, as decoding information, information that is necessary for decoding of the pixel group that is to be decoded;

b) performing a decoding process based on the decoding information; and c) generating pixel group information concerning the pixel group that is to be decoded based on a value based on the decoding information, and allowing the generated pixel group information to be stored in the memory area in the pixel group information storage means that is identified by the address of the pixel group that is to be decoded to update the pixel group information.

6. A non-transitory computer-readable medium storing a computer-readable program for causing a computer to execute the following steps, in a decoding apparatus that has pixel group information storage means including a plurality of memory areas each of which stores, as pixel group information, information concerning a corresponding pixel group and is referred to with a horizontal address of the pixel group in a frame, and an additional memory area that is located at a left end of the plurality of memory areas and stores a value that indicates invalid pixel group information:

a) acquiring the pixel group information stored in memory areas identified by an address of a pixel group that is to be decoded and an address to an immediate left of that address, and generating, as decoding information, information that is necessary for decoding of the pixel group that is to be decoded;

b) performing a decoding process based on the decoding information; and c) generating pixel group information concerning the pixel group that is to be decoded based on a value based on the decoding information, and allowing the generated pixel group information to be stored in the memory area in the pixel group information storage means that is identified by the address of the pixel group that is to be decoded to update the pixel group information.

7. A decoding apparatus, comprising:

a pixel group information storage section configured to include a plurality of memory areas each of which stores, as pixel group information, information concerning a corresponding pixel group and is referred to with a horizontal address of the pixel group in a frame, and an additional memory area that is located at a left end of the plurality of memory areas and stores a value that indicates invalid pixel group information;

a decoding information generation section configured to acquire the pixel group information stored in memory areas identified by an address of a pixel group that is to be decoded and an address to an immediate left of that address, and generate, as decoding information, information that is necessary for decoding of the pixel group that is to be decoded;

a decoding section configured to perform a decoding process based on the decoding information; and a pixel group information update section configured to generate pixel group information concerning the pixel group that is to be decoded based on a value based on the decoding information, and allow the generated pixel group information to be stored in the memory area in said pixel group information storage section that is identified by the address of the pixel group that is to be decoded to update the pixel group information.

8. A decoding apparatus, comprising:

a macroblock information storage section configured to include a plurality of memory areas each of which stores, as macroblock information, a conditional flag used for generating a context index increment for a corresponding macroblock and is referred to with a horizontal address of the macroblock in a frame, and an additional memory area that is located at a left end of the plurality of memory areas and stores a value that indicates invalid macroblock information;

a context index increment generation section configured to generate the context index increment based on the conditional flags stored in memory areas identified by an address of a macroblock that is to be decoded and an address to an immediate left of that address;

a decoding section configured to perform a context adaptive binary arithmetic coding decoding process based on a context index calculated based on the context index increment; and a macroblock information update section configured to generate the conditional flag concerning the macroblock that is to be decoded based on a value obtained as a result of the decoding process, and allow the generated conditional flag to be stored in the memory area in said macroblock information storage section that is identified by the address of the macroblock that is to be decoded to update the conditional flag.

* * * * *